United States Patent
Mansour et al.

(10) Patent No.: US 12,349,040 B2
(45) Date of Patent: Jul. 1, 2025

(54) EFFICIENT MULTI-CELL BACKHAUL OPERATION

(71) Applicant: T-MOBILE INNOVATIONS LLC, Overland Park, KS (US)

(72) Inventors: Nagi A. Mansour, Arlington, VA (US); Akin Ozozlu, McLean, VA (US); Kafi Hassan, Fairfax, VA (US)

(73) Assignee: T-Mobile Innovations LLC, Overland Park, KS (US)

( * ) Notice: Subject to any disclaimer, the term of this patent is extended or adjusted under 35 U.S.C. 154(b) by 617 days.

(21) Appl. No.: 17/526,397

(22) Filed: Nov. 15, 2021

(65) Prior Publication Data

US 2023/0156561 A1    May 18, 2023

(51) Int. Cl.
*H04W 40/22*    (2009.01)

(52) U.S. Cl.
CPC .................................. *H04W 40/22* (2013.01)

(58) Field of Classification Search
CPC .................................................... H04W 40/22
See application file for complete search history.

(56) References Cited

U.S. PATENT DOCUMENTS

| | | | |
|---|---|---|---|
| 9,699,792 B2 | 7/2017 | Yamamoto et al. | |
| 10,824,438 B2 | 11/2020 | Lu et al. | |
| 2018/0109347 A1* | 4/2018 | Cai | H04J 13/102 |
| 2018/0323851 A1* | 11/2018 | Zhuang | H04L 5/0048 |
| 2020/0413457 A1* | 12/2020 | Hong | H04W 76/10 |
| 2022/0271770 A1* | 8/2022 | Huynh | H03M 1/46 |
| 2022/0345202 A1* | 10/2022 | Huang | H04L 1/1896 |
| 2023/0345437 A1* | 10/2023 | Karout | H04W 72/0453 |
| 2023/0379792 A1* | 11/2023 | Muhammad | H04W 28/0289 |

\* cited by examiner

*Primary Examiner* — Sharmin Chowdhury
(74) *Attorney, Agent, or Firm* — Jones Robb, PLLC

(57) ABSTRACT

Methods, systems, and access nodes associate a corresponding unique code with multiple access nodes and multiplex data with each of the corresponding unique codes. Further, the multiplexed data is transmitted from each of the multiple access nodes to a donor node. At the donor node, a unique donor code is assigned and is multiplexed with the donor node data. The multiplexed data from the multiple access nodes and the multiplexed donor node data are transmitted in parallel from the donor node to a core network.

16 Claims, 6 Drawing Sheets

EFFICIENT MULTI-CELL BACKHAUL OPERATION

TECHNICAL BACKGROUND

A wireless network, such as a cellular network, can include an access node (e.g., base station) serving multiple wireless devices or user equipment (UE) in a geographical area covered by a radio frequency transmission provided by the access node. As technology has evolved, different carriers within the cellular network may utilize different types of radio access technologies (RATs). RATs can include, for example, 3G RATs (e.g., GSM, CDMA etc.), 4G RATs (e.g., WiMax, Long Term Evolution (LTE), etc.), and 5G RATs (new radio (NR)). As wireless technology continues to improve, various different iterations of radio access technologies (RATs) may be deployed within a single wireless network. Such heterogeneous wireless networks can include newer 5G and millimeter wave (mm-wave) networks, as well as older legacy networks.

Further, as wireless device technology improves, relay nodes are being deployed to improve service quality by relaying communication between an access node, and wireless devices in the wireless network. For example, relay nodes may be used at the edge of a coverage area of an access node to improve coverage and/or service, as well as in crowded areas having a high number of other wireless devices to increase the available throughput to the wireless devices being relayed. Relay nodes are generally configured to communicate with the serving access node (i.e. a "donor" access node) via a wireless connection, and to deploy a wireless air interface to which end-user wireless devices can attach. A backhaul portion of the network comprises the intermediate links between the core network the small subnetworks at the edge of the network, such as the connections between the relay wireless devices and donor nodes.

With the 5G RAT, a new backhaul option, Integrated Access and Backhaul (IAB) has been made available. IAB may be utilized to increase capacity in areas where fiber may be difficult to deploy. IAB can be utilized in cell sites that use wireless connectivity for both user traffic and backhaul. Cell sites implementing IAB technology do not add new capacity, but are able to share the capacity of a donor site across a larger coverage area. With 5G, the high frequencies of the Gigahertz spectrum have an inherent problem in that the shorter wavelengths have a dramatically smaller signal range and are far more susceptible to interference and degradation. Given that the effective distance of a 5G signal could be as little as 1,000 ft, the current design of 4G radio access networks (where the signal can reach up to 10 miles) becomes insufficient and IAB technology may be utilized to extend network reach.

Challenges associated with utilizing IAB technology include latency and lack of efficiency. Since the IAB technology uses multiple wireless links, existing protocols for IAB technology require different nodes to transmit in series to the donor node to minimize interference. Thus, an unintended latency is introduced. In operation, a donor node may act as a center pipe that carries its own data as well as data from other nodes. Thus, all data is transmitted through the donor node. Currently, all of the data is sent in a serial manner.

The problems set forth above negatively impact wireless device performance, particularly in dense or congested environments. Thus, a solution is needed for reducing latency and increasing efficiency in 5G networks utilizing IAB technology.

Overview

Exemplary embodiments described herein include systems, methods, and nodes for reducing latency and increasing efficiency. An exemplary method includes associating a corresponding unique code with multiple access nodes and multiplexing data with each of the corresponding unique codes. The method further includes transmitting the multiplexed data from each of the multiple access nodes to a donor node and assigning a unique donor code at the donor node. The method additionally includes multiplexing the unique donor code with donor node data and transmitting the multiplexed data from the multiple access nodes and the multiplexed donor node data in parallel from the donor node to a core network. In embodiments set forth herein, the method increases efficiency of multiple access nodes that employ integrated backhaul access (IAB) technology.

Exemplary embodiments further set forth herein include an access node comprising at least one processor programmed to perform multiple operations. The operations include associating a corresponding unique code with the multiple access nodes and receiving data in parallel from each of the multiple access nodes, the data multiplexed with the corresponding unique code for each of the multiple access nodes. The operations further include transmitting, in parallel, the multiplexed data from the multiple access nodes from the access node to a core network.

In a further exemplary embodiment, a method is provided for minimizing latency. The method includes associating a corresponding unique code with multiple access nodes utilizing integrated backhaul access (IAB) technology and transmitting data in parallel from each of the multiple access nodes to a donor node, the data multiplexed with the corresponding unique code for each of the multiple access nodes. The method further includes recognizing a data source at the donor node based on the corresponding unique code multiplexed with the data.

DETAILED DESCRIPTION

Figure 1:
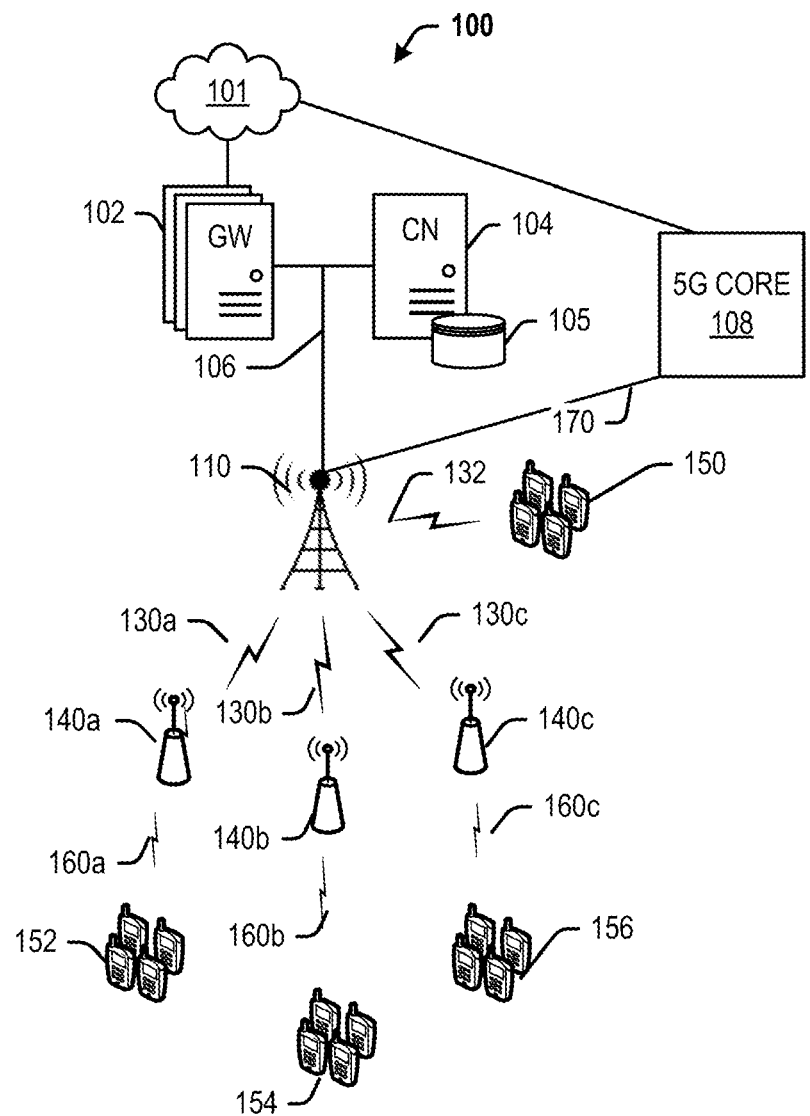
FIG. 1 depicts an exemplary system for wireless communication, in accordance with the disclosed embodiments.

Exemplary embodiments described herein include systems, methods, access nodes for creating low latency backhaul operation. Thus, embodiments as set forth herein, provide improved access node capabilities for transmitting data between nodes in an efficient manner. Embodiments set forth herein may operate in various network environments.

For example, the networks may include donor access nodes and relay nodes that are capable of communicating using a plurality of wireless air interfaces or RATs. For example, a donor access node can include a combination of a 4G evolved NodeB (eNodeB) and a 5G next generation NodeB (gNodeB). In other words, the access node can be configured to communicate using 4G LTE as well using 5G NR. In some embodiments, the donor access node can include a 4G eNodeB coupled to a plurality of 5G gNodeBs (one-to-many configuration). In similar embodiments, the donor access nodes can be selected from either the eNodeB or one of the 5G gNodeBs. Exemplary heterogeneous wireless networks described herein include donor access nodes and relay nodes that are capable of communicating using a plurality of wireless air interfaces or RATs. For example, a donor access node can include a combination of a 4G eNodeB and a 5G gNodeB. In other words, the access node can be configured to communicate using 4G LTE as well using 5G NR.

Embodiments as set forth herein expedite data transmission and processing by allowing parallel transmission of data. Parallel transmission is enabled by separating data originating from different access nodes so that the originating access node is easily identified. In embodiments set forth herein, a unique code is applied at each access node and multiplexed with the data originating at the access node. All types of access nodes may be equipped with the tools to generate a unique code, multiplex data with the unique code, and recognize codes from other access nodes.

In operation, multiple access nodes in a network may each generate a unique code, multiplex the unique code with data, and transmit the multiplexed data. In some embodiments, the multiple access node may transmit the respective multiplexed data to a single donor node functioning as a master node. Because the master node has the capability to identify the source of data based on the unique codes, the multiple access nodes are able to send data in parallel to the master node. Further, the multiple access nodes are able to use the same resource elements over the air to add efficiency.

In addition to recognizing the unique codes from the other access nodes, the master or donor node generates a unique code and multiplexes the unique code with data originating at the master node. Accordingly, the master node is able to transmit data originating at other access nodes and data originating at the master node to a core network in parallel. Thus, the master node acts as a centralized information transmitter for data from all other nodes. During transmission, the data from the multiple access nodes is separated by a scheme of codes. Embodiments described herein are particularly effective in high density areas, where a master access may interact with multiple secondary nodes. To achieve higher capacity, additional secondary or relay nodes can be incorporated.

The term "wireless device" refers to any wireless device included in a wireless network. For example, the term "wireless device" may include a relay node, which may communicate with an access node. The term "wireless device" may also include an end-user wireless device, which may communicate with the access node through the relay node. The term "wireless device" may further include an end-user wireless device that communicates with the access node directly without being relayed by a relay node.

The terms "transmit" and "transmission" in data communication may also encompass receive and receiving data. For example, "data transmission rate" may refer to a rate at which the data is transmitted by a wireless device and/or a rate at which the data is received by the wireless device.

An exemplary system described herein includes at least an access node (or base station), such as an eNodeB or a gNodeB), and a plurality of end-user wireless devices. For illustrative purposes and simplicity, the disclosed technology will be illustrated and discussed as being implemented in the communications between an access node (e.g., a base station) and a wireless device (e.g., an end-user wireless device). The disclosed technology is also be applied to communication between an end-user wireless device and other network resources, such as relay nodes, controller nodes, antennas, etc. Further, multiple access nodes may be utilized. For example, some wireless devices may communicate with an LTE eNodeB and others may communicate with an NR gNodeB. Other wireless devices may interact with both an eNodeB and a gNodeB.

FIG. 1 depicts an exemplary system 100 comprising a communication network 101, gateway 102, controller node 104, access node 110, relay nodes 140a, 140b, and 140c and wireless devices 150, 152, 154, and 156. In this exemplary embodiment, access node 110 may be macrocell access nodes configured to deploy wireless air interfaces 130, 130b, 130c, and 132 to which relay nodes 140a-c and other wireless devices 150 can attach and access network services from network 101. Relay nodes 140a-c may be configured to communicate with access node 110 over wireless air interfaces 130a, 130b, and 130c, referred to as wireless backhaul, and are further configured to deploy additional wireless air-interfaces 160a, 160b, and 160c to which wireless devices 152, 154, and 156 can attach. Relay nodes 140a-140c are thus configured to relay data between a donor access node 110 and wireless devices 152, 154, and 156 such that the wireless devices 152, 154, and 156 may access network services using any one of relay nodes 140a, 140b, and 140c rather than overload donor access node 110, which may be serving numerous other devices, such as devices 150 over communication link 132. Moreover, wireless devices that are outside a coverage area of access node 110 may access network services from donor access node 110 by virtue of being connected to one of relay nodes 140a, 140b, and 140c. Despite the limited number of nodes and end user devices shown, system 100 can include various other combinations of carriers/wireless air interfaces, antenna elements, access nodes, and wireless devices, as may be evident to those having ordinary skill in the art in light of this disclosure.

Further, access node 110 may be configured to deploy one or more wireless interfaces. For example, the access node 110 may include an eNodeB or gNodeB. Further the access node 110 may include wireless air interfaces using dual connectivity. For example, access node 110 can include a combination of an eNodeB and a gNodeB, such that each access node is be configured to deploy a wireless air interface using a first RAT (e.g. 4G LTE) and a second RAT (e.g. 5G NR). Each RAT can be configured to utilize a different frequency band or sub-band, a different channel size or bandwidth, and so on. For example, the 5G NR wireless air interface can be configured to utilize higher frequencies and larger channel bandwidths than the 4G LTE wireless air interface. Further, access node 110 can be configured to communicate using both RATs at the same time. For example, dual connections can be set up with any of relay nodes 140a-c using both 4G and 5G wireless air interfaces, with the 4G wireless air interface being used to transmit control information, and the 5G wireless air interface being used to transmit data information. In another example, either control or data transmissions may be transmitted using either 4G or 5G wireless air interface. In another example, a standalone 5G access node may be configured to deploy multiple 5G wireless air interfaces. Other implementations may be evident to those having ordinary skill in the art in light of this disclosure.

A processing node within system 100 (for example, communicatively coupled to access node 110 or any other network node) can be configured to perform operations for allocating wireless air interface resources to relay nodes 140a-c by identifying relay nodes 140a-c as being within range of donor access node 110. Identifying relay nodes 140a-c may be based on receipt of a request from each relay node 140a-c.

Access node 110 can be any network node configured to provide communication between relay nodes 140a, 140b, and 140c (and end-user wireless devices 152, 154, and 156 attached thereto) and communication network 101, including standard access nodes such as a macro-cell access node, base transceiver station, a radio base station, an eNodeB device, an enhanced eNodeB device, a gNodeB device (gNodeB) in 5G networks, or the like. In an exemplary embodiment, a macro-cell access node can have a coverage area in the range of approximately five kilometers to thirty-five kilometers and an output power in the tens of watts. Alternatively, access node 110 may comprise any short range, low power, small-cell access node such as a microcell access node, a picocell access node, a femtocell access node, or a home eNodeB/gNodeB device.

Access node 110 can comprise a processor and associated circuitry to execute or direct the execution of computer-readable instructions to perform operations such as those further described herein. Briefly, access node 110 can retrieve and execute software from storage, which can include a disk drive, a flash drive, memory circuitry, or some other memory device, and which can be local or remotely accessible. The software comprises computer programs, firmware, or some other form of machine-readable instructions, and may include an operating system, utilities, drivers, network interfaces, applications, or some other type of software, including combinations thereof. Further, access node 110 can receive instructions and other input at a user interface. Access node 110 communicates with gateway node 102 and controller node 104 via communication link 106. Access node 110 may communicate with each other, and other access nodes (not shown), using a wireless link or a wired link such as an X2 link. Components of exemplary access node 110 and processing nodes coupled thereto are further described with reference to FIGS. 2 and 4.

Wireless devices 150, 152, 154, and 156 may be any device, system, combination of devices, or other such communication platform capable of communicating wirelessly with relay nodes 140a, 140b, and 140c and/or access node 110 using one or more frequency bands deployed therefrom. Wireless devices 150, 152, 154, and 156 may be, for example, a mobile phone, a wireless phone, a wireless modem, a personal digital assistant (PDA), a voice over internet protocol (VoIP) phone, a voice over packet (VOP) phone, or a soft phone, as well as other types of devices or systems that can send and receive audio or data. Other types of communication platforms are possible.

Communication network 101 can be a wired and/or wireless communication network, and can comprise processing nodes, routers, gateways, and physical and/or wireless data links for carrying data among various network elements, including combinations thereof, and can include a local area network a wide area network, and an internetwork (including the Internet). Communication network 101 can be capable of carrying data, for example, to support voice, push-to-talk, broadcast video, and data communications by wireless devices 150, 152, 154, and 156. Wireless network protocols can comprise MBMS, code division multiple access (CDMA) 1×RTT, Global System for Mobile communications (GSM), Universal Mobile Telecommunications System (UMTS), High-Speed Packet Access (HSPA), Evolution Data Optimized (EV-DO), EV-DO rev. A, Third Generation Partnership Project Long Term Evolution (3GPP LTE), Worldwide Interoperability for Microwave Access (WiMAX), Fourth Generation broadband cellular (4G, LTE Advanced, etc.), and Fifth Generation mobile networks or wireless systems (5G, 5G New Radio ("5G NR"), or 5G LTE). Wired network protocols that may be utilized by communication network 101 comprise Ethernet, Fast Ethernet, Gigabit Ethernet, Local Talk (such as Carrier Sense Multiple Access with Collision Avoidance), Token Ring, Fiber Distributed Data Interface (FDDI), and Asynchronous Transfer Mode (ATM). Communication network 101 can also comprise additional base stations, controller nodes, telephony switches, internet routers, network gateways, computer systems, communication links, or some other type of communication equipment, and combinations thereof.

Communication link 106 can use various communication media, such as air, space, metal, optical fiber, or some other signal propagation path—including combinations thereof. Communication link 106 can be wired or wireless and use various communication protocols such as Internet, Internet protocol (IP), local-area network (LAN), S1, optical networking, hybrid fiber coax (HFC), telephony, T1, or some other communication format—including combinations, improvements, or variations thereof. Wireless communication links can be a radio frequency, microwave, infrared, or other similar signal, and can use a suitable communication protocol, for example, Global System for Mobile telecommunications (GSM), Code Division Multiple Access (CDMA), Worldwide Interoperability for Microwave Access (WiMAX), Long Term Evolution (LTE), 5G NR, or combinations thereof. Other wireless protocols can also be used. Communication link 106 can be direct links or might include various equipment, intermediate components, systems, and networks, such as a cell site router, etc. Communication link 106 may comprise many different signals sharing the same link. Communication link 106 may be associated with many different reference points, such as N1-Nxx, as well as S1-Sxx, etc.

Gateway node 102 can be any network node configured to interface with other network nodes using various protocols. Gateway node 102 can communicate user data over system 100. Gateway node 102 can be a standalone computing device, computing system, or network component, and can be accessible, for example, by a wired or wireless connection, or through an indirect connection such as through a computer network or communication network. For example, gateway node 102 can include a serving gateway (SGW), a public data network gateway (PGW), and/or a systems architecture evolution gateway (SAE-GW) associated with 4G LTE networks, or a user plane function (UPF) associated with 5G NR networks. One of ordinary skill in the art would recognize that gateway node 102 is not limited to any specific technology architecture, such as Long Term Evolution (LTE) or 5G NR, and can be used with any network architecture and/or protocol.

Gateway node 102 can comprise a processor and associated circuitry to execute or direct the execution of computer-readable instructions to obtain information. Gateway node 102 can retrieve and execute software from storage, which can include a disk drive, a flash drive, memory circuitry, or some other memory device, and which can be local or remotely accessible. The software comprises computer programs, firmware, or some other form of machine-readable instructions, and may include an operating system, utilities, drivers, network interfaces, applications, or some other type of software, including combinations thereof. Gateway node 102 can receive instructions and other input at a user interface.

Controller node 104 can be any network node configured to communicate information and/or control information over system 100. Controller node 104 can be a standalone computing device, computing system, or network component, and can be accessible, for example, by a wired or wireless connection, or through an indirect connection such as through a computer network or communication network. For example, controller node 104 can include a mobility management entity (MME), a control gateway (SGW-C or PGW-C), a session management function (SMF), access and mobility function (AMF), a home subscriber server (HSS), a policy control and charging rules function (PCRF), an authentication, authorization, and accounting (AAA) node, a rights management server (RMS), a subscriber provisioning server (SPS), a policy server, etc. One of ordinary skill in the art would recognize that controller node 104 is not limited to any specific technology architecture, such as Long Term Evolution (LTE) or 5G NR, and can be used with any network architecture and/or protocol.

Controller node 104 can comprise a processor and associated circuitry to execute or direct the execution of computer-readable instructions to obtain information. Controller node 104 can retrieve and execute software from storage, which can include a disk drive, a flash drive, memory circuitry, or some other memory device, and which can be local or remotely accessible. In an exemplary embodiment, controller node 104 includes a database 105 for storing information related to components of system 100, such as capabilities of relay nodes 140a, 140b and 140c and end-user wireless devices attached thereto, and so on. This information may be requested by or shared with access node 110 via communication links 106, 107, X2 connections, and so on. The software comprises computer programs, firmware, or some other form of machine-readable instructions, and may include an operating system, utilities, drivers, network interfaces, applications, or some other type of software, and combinations thereof. Further, controller node 104 can receive instructions and other input at a user interface.

The access node 110 may also connect via fiber 170 to a core 108, which may, for example, be a 5G core 108. The communication network 101, the access node 110 and/or the 5G core 108 may collectively implement several control plane network functions (NFs) and user plane NFs. The control plane NFs include but are not limited to a Network Slice Selection Function (NSSF), a Network Exposure Function (NEF), a Network Repository Function (NRF), a Policy Control Function (PCF), a Unified Data Management (UDM), an Application Function (AF), a Short Message Service Function (SMSF), a Core Access and Mobility management Function (AMF), a Session Management Function (SMF), and an Authentication Server Function (AUSF). The user plane NFs include but are not limited to a Unified Data Repository (UDR) and a UPF. Control plane NFs can provide one or more NFs based on a request-response or subscribe-notify model. The NFs may form a micro services-based architecture, which may include network functions distributed over different cloud infrastructures. Additionally, many services may span different network functions and domains that work in unison.

The NRF maintains the list of available network functions and their profiles. The NRF maintains an updated repository of the network components along with services provided by each of the elements in the core network. The NRF additionally provides a discovery mechanism that allows the elements to discover each other. The NRF provides a registration function that allows each network function to register a profile and a list of services with the NRF. It also performs services registration and discovery so that different network functions can find each other. As one example, the SMF, which is registered to NRF, becomes discoverable by the AMF when a UE or other device tries to access a service type served by the SMF. The NRF broadcasts available services once they are registered in the 5G core 108. To use other network functions, registered functions can send service requests to the NRF.

The UDM interfaces with NFs such as AMF and SMF so that relevant data becomes available to AMF and SMF. The UDM generates authentication vectors when requested by the AUSF, which acts as an authentication server. The AMF performs the role of access point to the 5G core 108, thereby terminating RAN control plane and UE traffic originating on either the N1 or N2 reference interface. In the 5G core 108, the functionality of the 4G Mobility Management Entity (MME) is decomposed into the AMF and the SMF. The AMF receives all connection and session related information from the UE using N1 and N2 interfaces, and is responsible for handling connection and mobility management tasks.

The UDR may provide unified data storage accessible to both control plane NFs and user plane NFs. Thus, the UDR may be a repository shared between control plane NFs and the UPF. The UDR may include information about subscribers, application-specific data, and policy data. The UDR can store structured data that can be exposed to an NF. The UPF may perform operations including, but not limited to, packet routing and forwarding, packet inspection, policy enforcement for the user plane, Quality-of-Service (QoS) handling, etc. When compared with 4G EPC, the functions of the UPF may resemble those of the SGW-U (Serving Gateway User Plane function) and PGW-U (PDN Gateway User Plane function).

Other network elements may be present in system 100 to facilitate communication but are omitted for clarity, such as base stations, base station controllers, mobile switching centers, dispatch application processors, and location registers such as a home location register or visitor location register. Furthermore, other network elements that are omitted for clarity may be present to facilitate communication, such as additional processing nodes, routers, gateways, and physical and/or wireless data links for carrying data among the various network elements, e.g. between access node 110 and communication network 101.

Further, the methods, systems, devices, networks, access nodes, and equipment described herein may be implemented with, contain, or be executed by one or more computer systems and/or processing nodes. The methods described above may also be stored on a non-transitory computer readable medium. Many of the elements of communication system 100 may be, comprise, or include computers systems and/or processing nodes. This includes, but is not limited to: access node 110, relay nodes 140a, 140b, and 140c, gateway(s) 102, controller node 104, and/or network 101.

Figure 2:
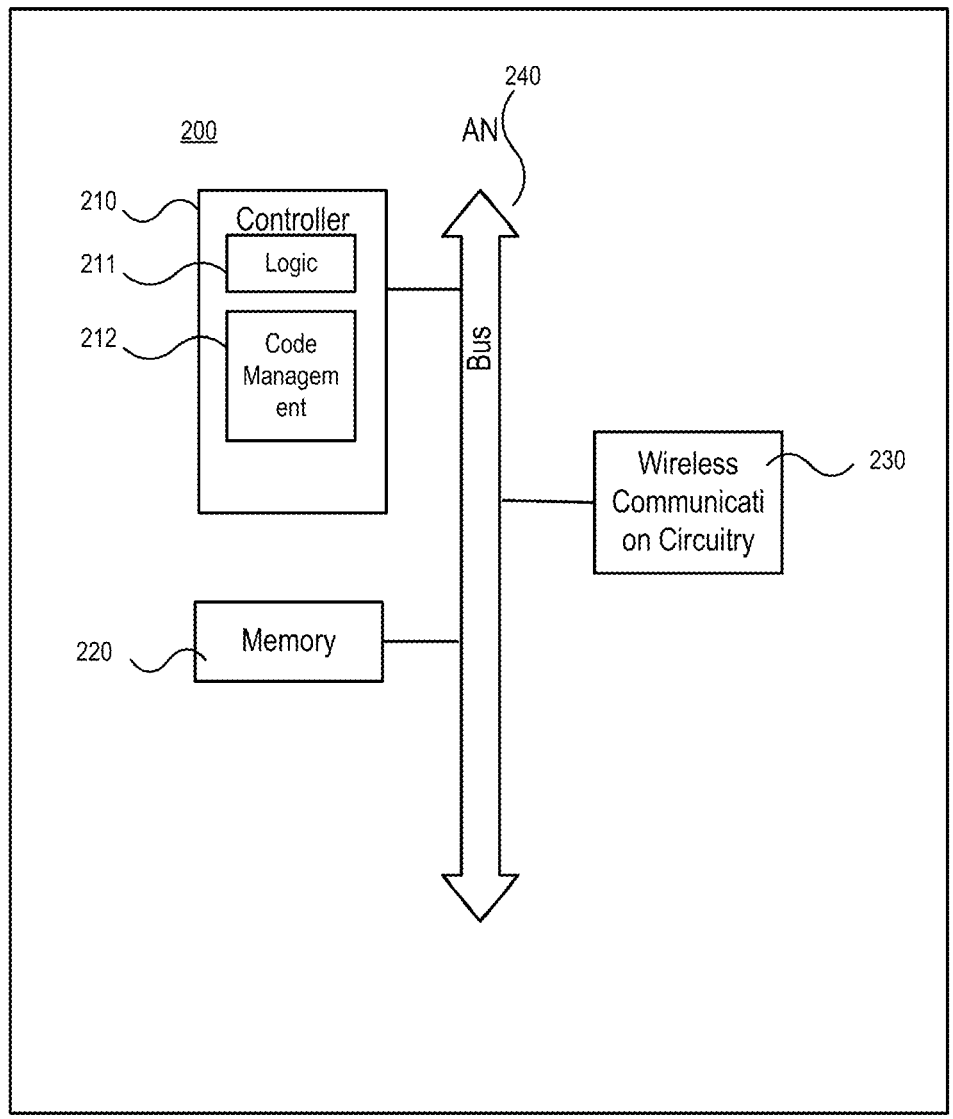
FIG. 2 illustrates an exemplary configuration of an access node in accordance with disclosed embodiments.

FIG. 2 illustrates one example of an access node 200, which may correspond to one or more of the access nodes 110 and 140a, 140b, and 140c shown in FIG. 1. As illustrated the access node 200 includes a controller 210, a memory 220, wireless communication circuitry 230, and a bus 240 through which the various elements of the access node 200 communicate with one another. As illustrated, the controller 210 includes sub-modules or units, each of which may be implemented via dedicated hardware (e.g., circuitry), software modules which are loaded from the memory 220 and processed by the controller 210, firmware, and the like, or combinations thereof. These sub-modules or units include a logic processor 211 (e.g., logic circuitry or a logic program) configured to perform various settings and/or determinations and a code management processor 212 (e.g., code management circuitry or a code management program) configured to perform various code management functions.

The logic processor 211 may be configured to perform one or more operations including determining a signal origin based on received multiplexed data. Thus, the logic processor may be configured to demultiplex data. The signal origin may be, for example, one of the access nodes shown in FIG. 1. The logic processor 211 may further be configured to schedule transmission of signals.

The code management processor 212 may be configured to generate codes, identify codes, and multiplex codes with data for transmission. For example, the code management unit 212 may instruct the access node 200 to multiplex a communication signal with an orthogonal code (e.g., a code division multiplex (CDM) code) prior to transmitting the communication signal (e.g., to the connected wireless device or to a core network) The code management processor 212 may also instruct the recipient device (either the connected wireless device, the access node 200, or a core network) to separate the communication signal that has been multiplexed with the orthogonal code from signals that have not been multiplexed with the orthogonal code. The code management processor 212 may also instruct the recipient device to separate the orthogonal code from the received communication signal. The code management processor 212 may alternatively be configured to instruct the neighboring access node (rather than the access node 200 itself) to implement the multiplexing and demultiplexing procedures. These and other instructions may be performed in response to a determination (e.g., by the logic processor 211) that a signal multiplexed with a code has been received or transmitted.

In this manner, the wireless device and/or access node may be capable of distinguishing communications (e.g., between the access nodes 110 and 140a, 140b, and 140c of FIG. 1) from extraneous communications even if those communications occupy the same or similar frequencies in the same link direction for one or more time slots.

The logic processor 211 and/or the code management processor 212 may physically reside within the controller 210, or may be virtual structures operable to control other components of the access node 200 to implement the above operations. For example, the code management processor 212 may be configured to itself multiplex the communication signal with the orthogonal code, or may be configured to provide a control signal to the wireless communication circuitry 230 thereby to cause the wireless communication circuitry 230 to multiplex the communication signal with the orthogonal code. Moreover, one or more of the units may instead reside within the memory 220 and/or may be provided as separate units within the access node 200. Moreover, while the logic processor 211 and the code management processor 212 are illustrated as separate units, in practical implementations some or all of the units may be combined and/or share components.

The wireless communication circuitry 230 may include circuit elements configured for inbound communication to receive wireless signals (e.g. one or more antennas) as well as interface elements configured, for example, to translate data signals from wireless input into control or other signals for the controller 210. Moreover, the wireless communication circuitry 230 may include circuit elements configured for outbound communication to generate wireless signals (e.g., one or more antennas) as well as interface elements configured, for example, to translate control signals from the controller 210 into data signals for wireless output. For example, the access node 200 may be configured to receive connection requests via the wireless communication circuitry 230 and output connection determinations via the wireless communication circuitry 230, thereby allowing or denying the connection requests. The access node 200 may include additional wireless communication circuitry elements, for example to communicate using additional frequencies and/or to provide connectivity for different RATs. The access node 200 may further include additional wired communication circuitry elements.

Figure 3:
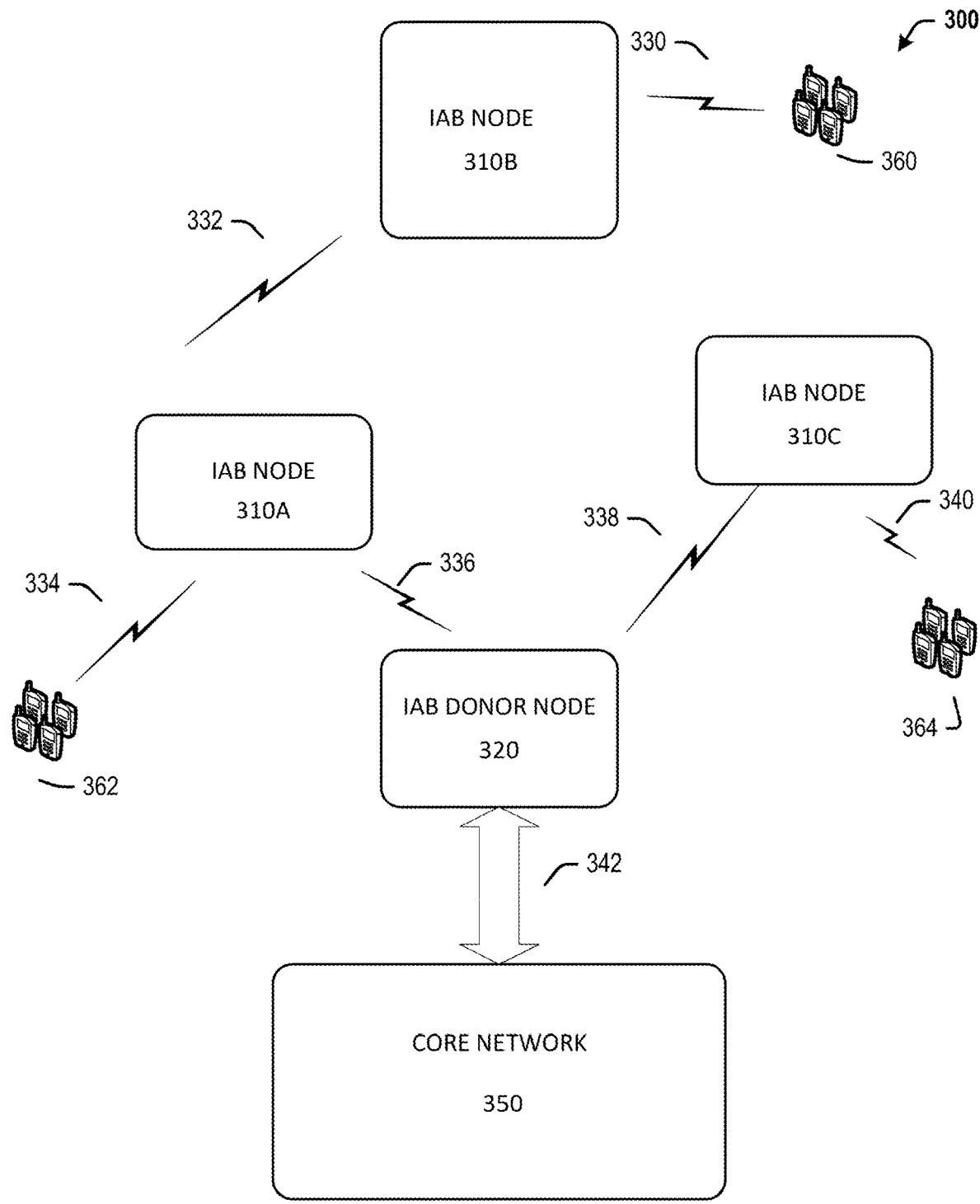
FIG. 3 depicts an IAB system architecture in accordance with disclosed embodiments.

FIG. 3 illustrates an IAB system architecture 300 implementing embodiments herein. IAB specifications define two antenna system types including an IAB node 310A, 310B, and 310C and an IAB donor node 320. IAB donor 320 terminates the backhaul traffic from distributed IAB nodes 310A, 310B, and 310C. The node 310A, 310B, and 310C can be backhaul endpoints or relays between those endpoints and the donor 320. Both IAB donor 320 and nodes 310A, 310B, and 310C may serve wireless device 360, 362, and 364.

Thus, the system architecture 300 includes multiple IAB nodes 310A, 310B, and 310C, which communicate with a core network 350 through an IAB donor node 320. Further, multiple wireless devices 360, 362, and 364 communicate with IAB nodes 310A, 310B, and 310C respectively through wireless access links 330, 334, and 340. The IAB nodes 310A, 310B, and 310C communicate with the IAB donor node 320 over wireless backhaul links 332, 336, and 338. The IAB donor node 320 connects to a core network 350 via a wired non-IAB backhaul 342, which may be high capacity fiber. It should be noted that although only three IAB nodes are shown, IAB nodes can be backhauled to the donor node through more than one intermediate IAB node and thus, multi-hop backhauling is supported in IAB. IAB nodes 310A, 310B, and 310C do not add new capacity. They instead share the capacity of the donor site 320 efficiently across a much larger coverage area.

As shown, the architecture provides for multi-hop deployments. For example, IAB node 310A may behave as a donor for IAB node 310B. Though not shown, each IAB node could connect to multiple sites or IAB nodes, thus, providing redundancy. IAB nodes are transparent to devices so that devices connect to IABs just as they would to any regular base stations. IAB technology leverages spectral efficiencies of NR and increased capacity afforded by the higher bands available to deliver an alternative to optical cell site backhaul. IAB allows for multi-hop backhauling using the same frequencies employed for user equipment (UE) access or alternatively using a distinct, dedicated, frequency.

Figure 4:
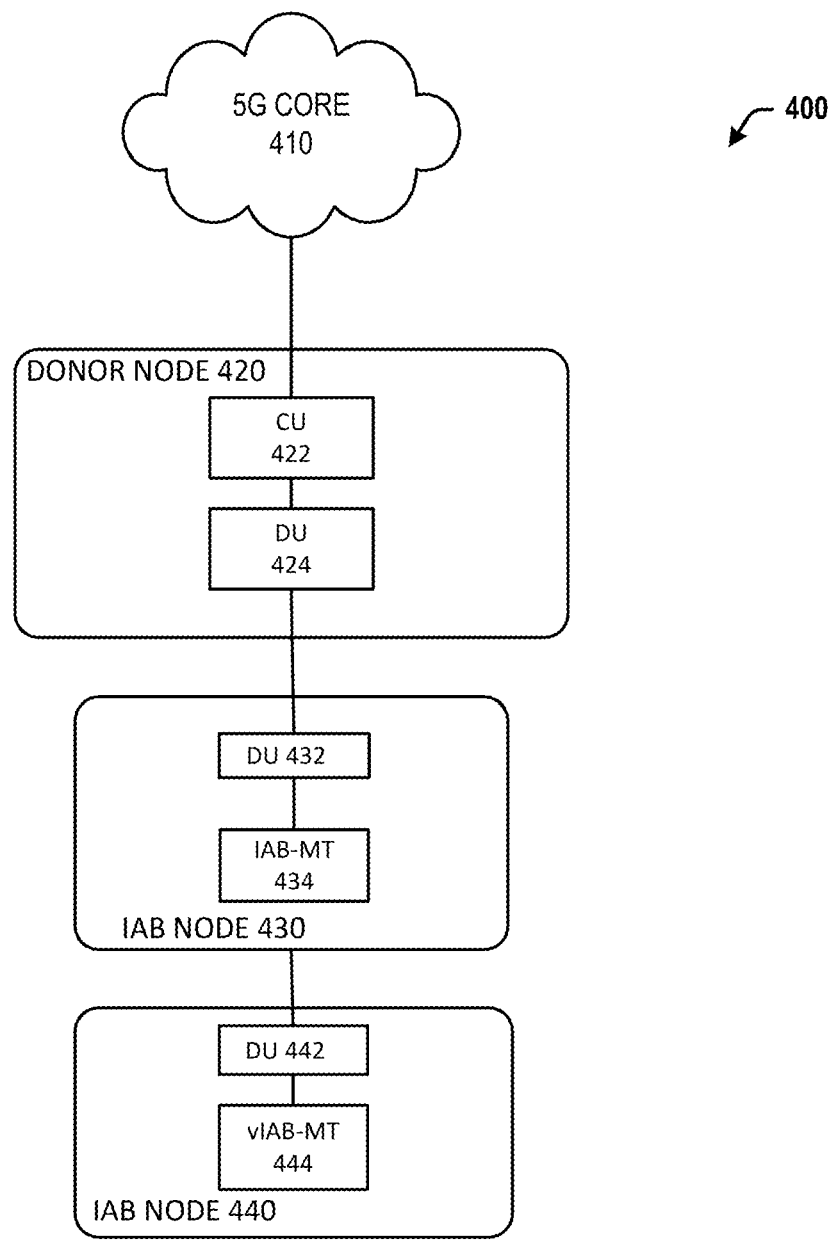
FIG. 4 depicts access nodes within an IAB system architecture in accordance with the disclosed embodiments.

FIG. 4 illustrates a more detailed configuration 400 of a donor node 420 and IAB nodes 430 and 440 connected to a 5G core 410. In the displayed embodiment, IAB technology is implemented in a decomposed radio access network (RAN) model, such as open RAN (O-RAN), which decouples a distributed unit (DU) from a central unit (CU). The O-RAN includes multiple disaggregated components, such as a RAN Intelligent Controller (RIC), centralized unit (CU), distributed unit (DU), and radio unit (RU). The CU generally is centralized so as to control the operation of several DUs. The DUs are distributed to as to be closer to radio units (RUs) may in some instances be integrated with the RUs.

As is shown below, a CU 422 is incorporated into the donor node 420, but is not necessary in the IAB nodes 430 and 440. In embodiments set forth herein, a single IAB system of one or more IAB nodes 430 and 440 and the IAB donor node 420 may, together, deemed a single gNB.

As illustrated, the donor node 420 is connected with the IAB nodes 430 and 440. The donor node 420 may include a centralized unit (CU) 422 and a distributed unit (DU) 424. Although not shown, the donor node 420 may include more than one DU 424. The CU 422 is the centralized unit that runs the Radio Resource Control (RRC) and Packet Data Convergence Protocol (PDCP) layers. The donor node 420 includes the CU 422 and one DU 424, which is connected to the CU 422 by different interfaces for the control plane and user plane. In some instances, CU 422 may interface with and control the operation of multiple DUs to support multiple gNBs. The split architecture enables a 5G network to utilize different distribution of protocol stacks between CU and DUs depending on mid-haul availability and network design. The CU 422 is a logical node that includes the gNB functions like transfer of user data, mobility control, RAN sharing, positioning, etc.

The DU 424 includes the Radio Link Control (RLC), Medium Access Control (MAC), and Physical layer (PHY) protocols. The interface between CU and DU is standardized as F1 interface, which defines the higher layer protocols. It should be understood that the DU 424 includes hardware components, such as a processor and memory.

The IAB node 430 may include a DU 432, substantially similar to the DU described above, as well as an IAB Mobile Termination (MT) antenna 434. The IAB-MT 434 may be an independent set of arrays. The IAB node 440 may include a DU 442 and virtual IAB-MT (vIAB-MT) 444. The vIAB-MT 444 shares the same antenna used for access as shared frequency and combined radio unit implementations may be more efficient than the decoupled alternatives.

The IAB nodes 430 and 440 rely on AB for backhauling and provide service for UEs and IAB nodes via the DU functionality. The MTs associate with the DU of the parent IAB node or IAB donor 420. The message transmission is based on the lower layer functionality provided by the link between the IAB node MTs 434 and 444 and the parent node DU 424. The IAB nodes 430 and 440 can be backhauled to the IAB donor 420 through more than one intermediate IAB node, implying that multi-hop backhauling is supported in the IAB network. Further, the displayed configuration is merely exemplary, as any number of IAB nodes with either IAB-MTs or vIAB-MTs may be provided.

Figure 5:
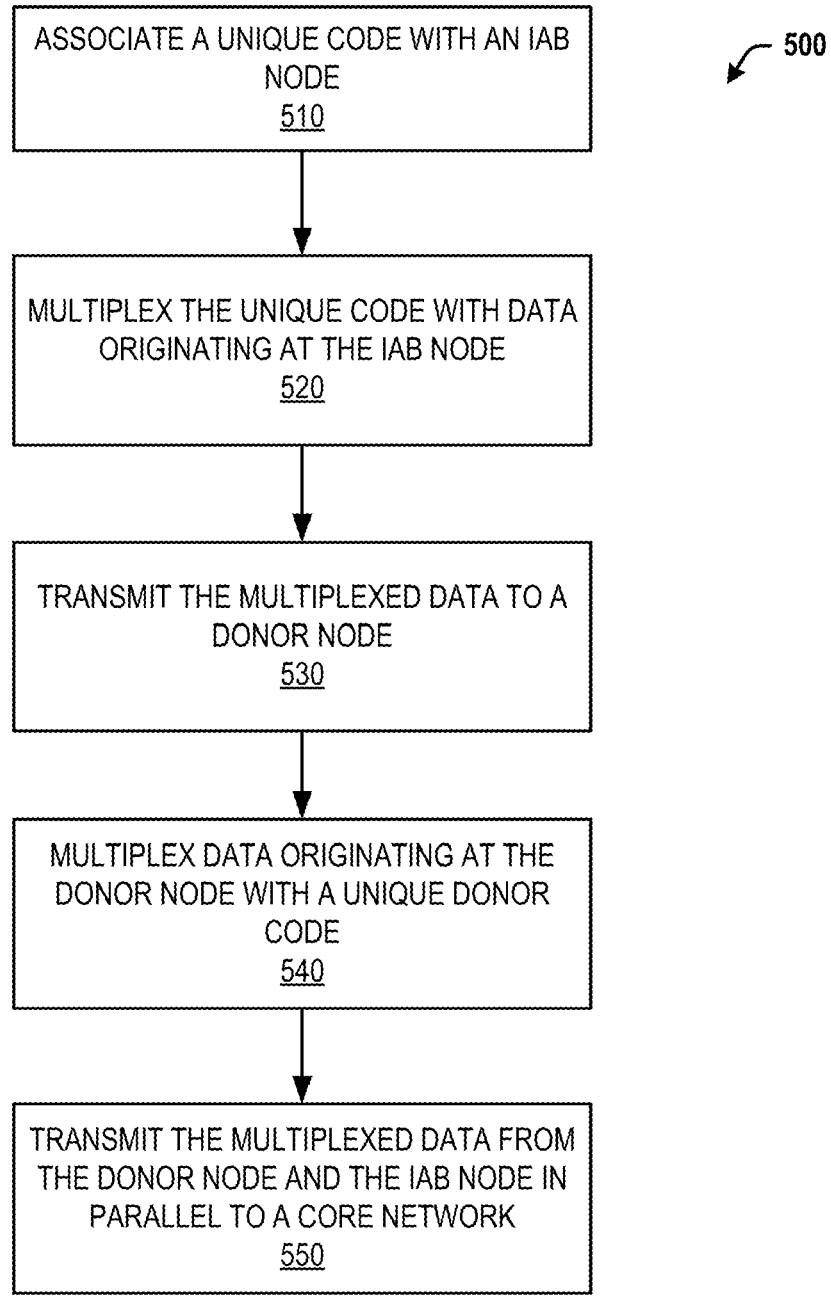
FIG. 5 depicts an exemplary method for low latency multi-cell backhaul operation in accordance with disclosed embodiments.

The disclosed methods for low latency multi-cell backhaul operations are further discussed with reference to FIGS. 5 and 6. FIG. 5 illustrates an exemplary method 500 for low latency multi-cell backhaul operation in accordance with disclosed embodiments. The steps illustrated in FIG. 5 may be performed by any suitable processor discussed herein, for example, a processor included in access node 110, 140*a-c*, 200, 310*a-c*, 320 or processor included in controller node 104. For discussion purposes, as an example, method 500 is described as being performed by a processor included in access nodes 310A and 320.

Method 500 starts in step 510 when the access node 310A associates with a unique code. In embodiments provided herein, the access node 310A generates or stores a unique code for use. The code may be generated by the code management processor 212 shown in FIG. 2. Alternatively, the code may be generated by a donor node or controller node and provided to the access node 310A. In embodiments provided herein, the code is a CDMA code, such that it is orthogonal to other codes in the network. Other coding schemes that may be utilized to prevent interference and lower latency are within the scope of the disclosure.

At step 520, the access node 310A multiplexes the unique code with data originating at the access node 310A. At step 530, the access node 310A transmits the multiplexed data to the donor node 320. The transmission of step 320 may be accomplished, for example with an IAB-MT or a vIAB-MT such as those shown in FIG. 4. In embodiments set forth herein, the transmission is made to a DU of the donor node 320.

At step 540, the donor node 320 multiplexes data originating at the donor node with a unique donor code. The unique donor code may be generated by or retrieved from storage by a code management processor of the donor node 320. The donor code is configured to distinguish data sent from the donor node from the data sent from the IAB node 310A. Thus, in embodiments provided herein, the unique donor code is orthogonal to the IAB node code multiplexed by the IAB node 310.

In step 550, the donor node 320 transmits the multiplexed data from step 540 simultaneously with the multiplexed data from the IAB node to the core network. The codes enable the data to be sent in parallel without interference. Further, the uplink communications may be demultiplexed (i.e., separated) upon receipt by the core network. The method as illustrated in FIG. 5 may be performed continuously or in response to changes in a network that create a possibility of interference.

Figure 6:
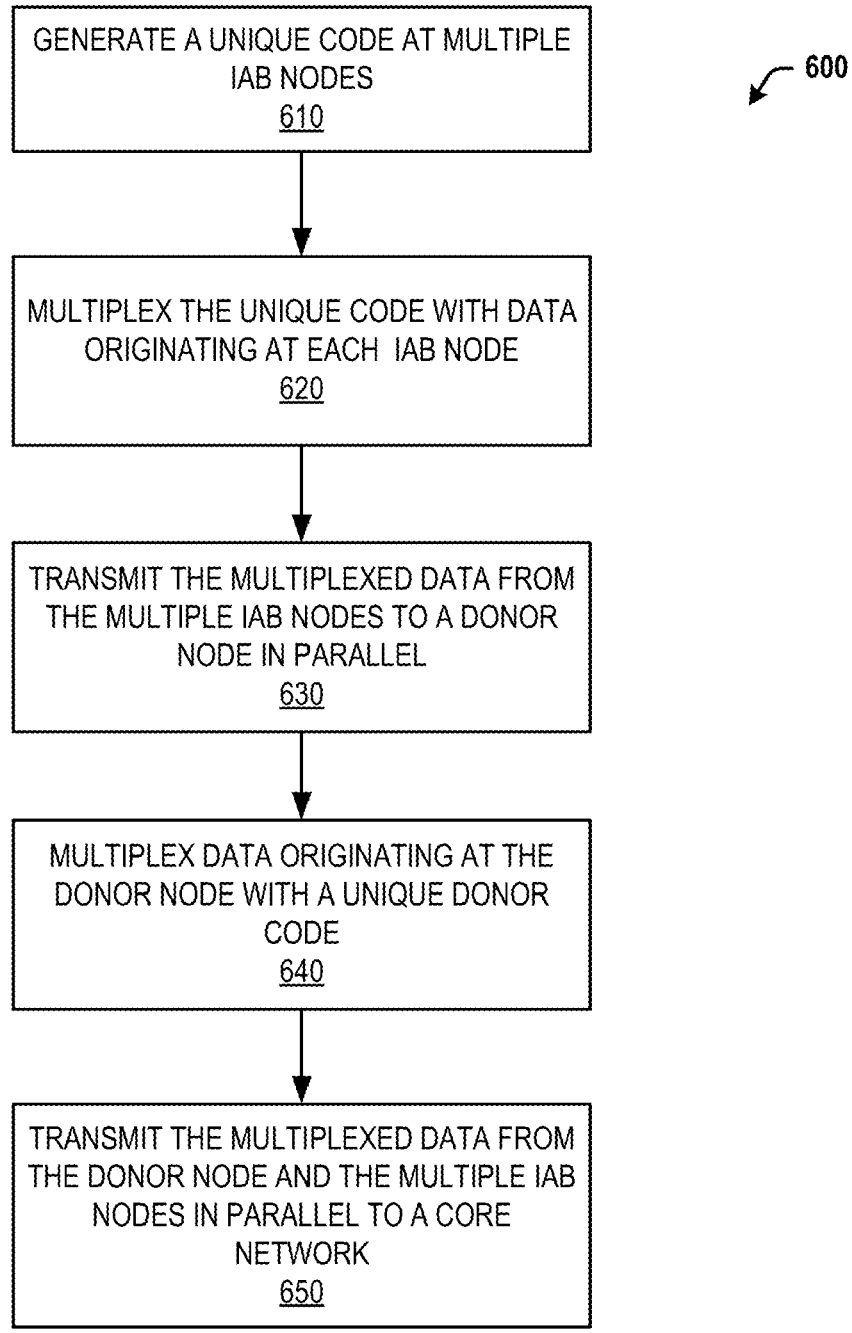
FIG. 6 depicts another exemplary method for low latency multi-cell backhaul operation in accordance with disclosed embodiments.

FIG. 6 illustrates an additional method for low latency multi-cell backhaul operation. The steps illustrated in FIG. 6 may be performed by any suitable processor discussed herein, for example, may be performed by any suitable processor discussed herein, for example, a processor included in access node 110, 140*a-c*, 200, 310*a-c*, 320 or processor included in controller node 104. For discussion purposes, as an example, method 500 is described as being performed by a processor included in access nodes 310A-C and 320.

In step 610, multiple IAB nodes 310A, 310B, and 310C generate or retrieve unique codes. The nodes 310A, 310B, and 310C may utilize a code management processor, such as that shown in FIG. 2. Each of the codes from 310A, 310B, and 310C may be CDMA codes that are orthogonal to one another. The codes may be generated or stored and retrieved for use by a code management processor at each node. Other unique codes that distinguish the three nodes as sources of information, minimize interference and lower latency are also within scope of the disclosure. While step 610 is described as one step, the codes may be generated at the same or different times.

In step 620, each of the nodes 310A, 310B, and 310C multiplexes its respective unique code with data for transmission and in step 630, the nodes transmit the multiplexed data in parallel to the donor node 320 and step 630, the nodes 310A, 310B, and 310C transmit the multiplexed data to the donor node 320 in parallel. Because the data is separated by the unique code, the donor node 320 is able to identify the source of each transmission upon receipt of the multiplexed data.

In step 640, the donor node 320 multiplexes data originating at the donor node 320 with a unique donor code. The donor node 320 may generate or retrieve the unique donor code using, for example, the code management processor 212.

Finally, in step 650, the donor node 320 transmits the multiplexed data from both the donor node 320 and all of the multiple access nodes 310A, 310B and 310C to a core network in parallel. The core network can distinguish between data sources based on the unique codes and is capable of demultiplexing received data.

In some embodiments, methods 500 and 600 may include additional steps or operations. Furthermore, the methods may include steps shown in each of the other methods. As one of ordinary skill in the art would understand, the methods 500 and 600 may be integrated in any useful manner. Additionally, in order to optimize the network, the methods disclosed may be performed for multiple access node devices in the network.

In addition to the systems and methods described herein, the operations of performing low latency multi-cell backhauling may be implemented as computer-readable instructions or methods, and processing nodes on the network for executing the instructions or methods. The processing node may include a processor included in the access node or a processor included in any controller node in the wireless network that is coupled to the access node.

The exemplary systems and methods described herein may be performed under the control of a processing system executing computer-readable codes embodied on a computer-readable recording medium or communication signals transmitted through a transitory medium. The computer-readable recording medium may be any data storage device that can store data readable by a processing system, and may include both volatile and nonvolatile media, removable and non-removable media, and media readable by a database, a computer, and various other network devices.

Examples of the computer-readable recording medium include, but are not limited to, read-only memory (ROM), random-access memory (RAM), erasable electrically programmable ROM (EEPROM), flash memory or other memory technology, holographic media or other optical disc storage, magnetic storage including magnetic tape and magnetic disk, and solid state storage devices. The computer-readable recording medium may also be distributed over network-coupled computer systems so that the computer-readable code is stored and executed in a distributed fashion. The communication signals transmitted through a transitory medium may include, for example, modulated signals transmitted through wired or wireless transmission paths.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. As a result, the invention is not limited to the specific embodiments described above, but only by the following claims and their equivalents.

What is claimed is:

1. A method comprising:
   associating a corresponding unique code with each of multiple integrated access and backhaul (IAB) access nodes, wherein the corresponding unique code is different for each IAB access node;
   multiplexing corresponding data at each of the multiple IAB nodes with the corresponding unique code;
   transmitting the multiplexed corresponding data originating from each of the multiple IAB access nodes including the corresponding unique code in parallel over wireless backhaul links to a donor node, the corresponding unique code enabling the donor node to identify a source node for the transmitted multiplexed corresponding data and to distinguish the transmitted multiplexed corresponding data from extraneous communications;
   assigning a unique donor code at the donor node;
   multiplexing the unique donor code with donor node data originating at the donor node; and
   transmitting the multiplexed corresponding data transmitted from the multiple IAB access nodes and the multiplexed donor node data originating at the donor node in parallel from the donor node to a core network.

2. The method of claim 1, wherein the multiple IAB access nodes include a distributed unit (DU) and an IAB mobile termination (MT) antenna.

3. The method of claim 2, wherein the multiple IAB access nodes are small cell access nodes.

4. The method of claim 1, wherein transmitting the data from each of the multiple IAB access nodes to the donor node comprises transferring the data to an intermediate node prior to the donor node.

5. The method of claim 1, wherein the donor node identifies one of the multiple IAB access nodes as an origination node based on the corresponding unique code.

6. The method of claim 1, wherein the core network identifies the data as originating from one of the multiple IAB access nodes based on the corresponding unique code.

7. The method of claim 1, wherein the core network identifies the multiplexed donor node data as originating from the donor node based on the unique donor code.

8. The method of claim 1, wherein all of the multiple IAB access nodes identify data from another access node based on the corresponding unique code transmitted with the data.

9. The method of claim 1, wherein the core network is a 5G new radio network.

10. The method of claim 1, wherein the donor access node includes a centralized unit (CU) and a distributed unit (DU).

11. A donor access node comprising:
    at least one processor programmed to perform multiple operations, the operations including:
      associating a corresponding unique code with each of multiple integrated access and backhaul (IAB) access nodes;
      receiving corresponding data in parallel from each of the multiple IAB access nodes along with the corresponding unique code, the corresponding data multiplexed with the corresponding unique code for each of the multiple IAB access nodes, the corresponding unique code enabling the donor access node to identify a source node for the received corresponding data and to distinguish the received corresponding data from extraneous communications;
      transmitting, in parallel, the multiplexed data received from the multiple IAB access nodes from the donor access node to a core network; and
      multiplexing donor node data with a unique donor code and transmitting the multiplexed donor node data to the core network.

12. The donor access node of claim 11, wherein the donor access node receives the corresponding data from the multiple IAB access nodes and identifies an originating IAB access node for the corresponding data based on the corresponding unique code.

13. The donor access node of claim 11, wherein the core network is a 5G new radio (NR) network.

14. A method for minimizing latency, the method comprising:

associating a corresponding unique code with each of multiple integrated access and backhaul (IAB) access nodes;

transmitting corresponding data originating from the multiple IAB access nodes in parallel from each of the multiple IAB access nodes including the corresponding unique code to a donor node, the corresponding data multiplexed with the corresponding unique code for each of the multiple IAB access nodes, the corresponding unique code enabling the donor access node to identify a source node for the received corresponding data and to distinguish the received corresponding data from extraneous communications;

recognizing an originating IAB access node as a data source at the donor node based on the corresponding unique code multiplexed with the corresponding data;

utilizing a unique donor code at the donor node and multiplexing donor node data with the unique donor code for transmission to a core network; and transmitting the corresponding multiplexed data from each of the multiple IAB access nodes from the donor node to the core network in parallel with the multiplexed donor node data.

15. The method of claim 14, wherein the core network identifies the corresponding multiplexed data as originating from one of the multiple IAB access nodes based on the corresponding unique code.

16. The method of claim 14, wherein the core network identifies the multiplexed donor data as originating from the donor node based on the unique donor code.

* * * * *